(No Model.)

C. GOODYEAR, Jr.
MAGIC LANTERN LENS.

No. 494,855. Patented Apr. 4, 1893.

WITNESSES:
Chas. Nieu.
Harold Binney

INVENTOR
Charles Goodyear Jr.
BY
ATTORNEY.

UNITED STATES PATENT OFFICE.

CHARLES GOODYEAR, JR., OF NEW YORK, N. Y.

MAGIC-LANTERN LENS.

SPECIFICATION forming part of Letters Patent No. 494,855, dated April 4, 1893.

Application filed May 4, 1892. Serial No. 431,838. (No model.)

*To all whom it may concern:*

Be it known that I, CHARLES GOODYEAR, Jr., of New York city, New York, have invented new and useful Improvements in Magic-Lantern Lenses, of which the following is a description, reference being taken to the accompanying drawings, which form a part of this specification.

In magic lanterns the great heat received by the condenser lenses makes it necessary that they be held in a manner to allow for the unequal expansion of the lenses and of the holders, and for this reason the lenses are usually mounted loosely within a lens case. Often also, the unequal distribution of heat, causing, as it does, unequal expansion of the glass of the lens, and internal strains, breaks a lens, and necessitates its removal and the substituting of a new one before the lantern can again be used. By my invention I seek to more securely hold the lenses in place, and, at the same time, amply provide for expansion and allow a ready and quick substitution of new for broken lenses.

To these ends my invention consists in the apparatus and its parts constructed, arranged, combined, and used, substantially as hereinafter described, illustrated, and claimed.

In my application Serial No. 430,417 for patent on a magic lantern, which application was filed on the 23d day of April, 1892, I have disclosed an interchangeable and adjustable support and case for condenser lenses, which permits of the substitution of a new set of condensers already mounted on such a support. I now shall disclose the details of such support combined with certain new features of the lens case whereby I accomplish the purposes of this present invention and enable the operator quickly to renew either lens without the removal of the case or of the other lens.

Figure 1:
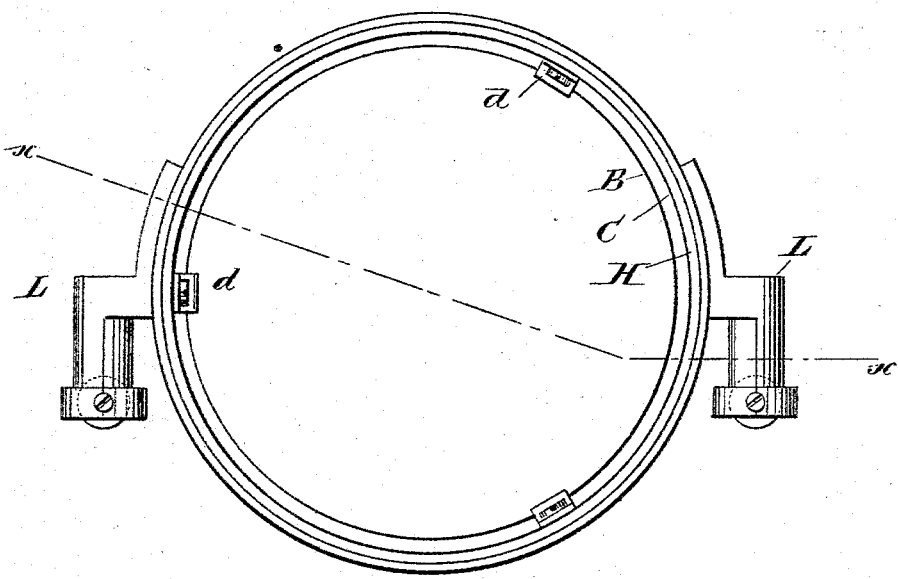
Figure 2:
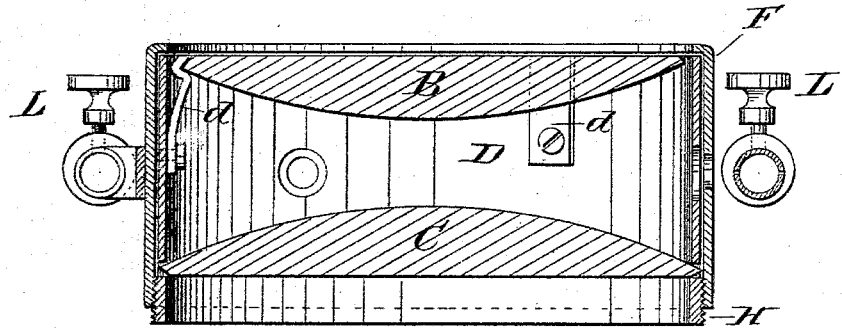

In the drawings Figure 1 is an elevation of my lenses and support as viewed looking toward the lantern light. Fig. 2 is a horizontal sectional view of the same, on lines $x$—$x$ of Fig. 1.

Like letters of reference in the two views refer to like parts.

At B is shown the lens that is nearer the light. This lens may be and in my invention is somewhat smaller than the more remote lens C. In Fig. 1 both lenses appear superposed. The lens B is carried by a metallic ring D, and is retained therein by means of three spring clamps $d$ which fit upon the edge of the lens and, owing to the size of the lens and the ring D, preserve an annular air space about the edges of the lens. The ring D fits snugly within the lens case proper, F, within which it may be slipped. A flange upon the case at the edge nearer the light prevents the ring D from protruding from the case at that point. The lens C, which loosely fits the case, may now be slipped in until it rests against the edge of the ring D, and may be retained in place by the usual screw ring H threaded into the case F. It will now be seen that although the lens C is retained in no novel way, both lenses may be withdrawn from the case merely by the removal of the screw ring H without disturbing either the lens case or the light. The lens C may be changed by the removal of the ring H in the usual way and this feature is not in itself novel with me. The lens B may be removed by depressing the clamps $d$ and a new one quickly put in its place. To this last feature I attach great importance for it is this lens which is far more usually broken and by my device I do not have to disturb the lamp or lamp hood or move the lens case.

It will be clear that lenses varying considerably in diameter may be used with my clamps and will be firmly retained thereby.

The case F and the ring D are preferably perforated at several points as shown, and these perforations in conjunction with the annular space about the lens B effectually ventilate the lens case and greatly reduce the heating effects of the lamp.

To each side of the lens case are secured the adjustable bracket supports L adapted to slide upon the vertical posts or rods of the frame of my lantern, as set forth in the application already referred to.

I have now disclosed one embodiment of my invention and the manner in which it may be used, and I therefore claim as my own and desire to secure by these Letters Patent the following:

1. The combination, for the purposes described, of a lens, a ring or frame D therefor, a casing or support F for the said ring or frame, and retaining clamps secured to the said ring or frame and bearing upon the edge of the said lens, substantially as set forth.

2. A lens holder consisting of a ring or frame provided with spring retaining clamps formed to fit the edge of the lens, substantially as, and for the purposes, set forth.

3. A lens holder provided with clamps adapted to embrace the edge of the lens and to hold the same from contact with the walls of the said lens holder, whereby an air space is formed between the edge of the lens and the said walls.

In testimony whereof I have hereunto set my hand this 12th day of February, 1892.

CHARLES GOODYEAR, JR.

Witnesses:
G. M. PLYMPTON,
HAROLD BINNY.